United States Patent [19]

Urasaki et al.

[11] 4,333,907

[45] Jun. 8, 1982

[54] BIAXIALLY ORIENTED WHOLLY AROMATIC POLYESTER FILM

[75] Inventors: Takanori Urasaki, Hino; Yasuji Hirabayashi, Hachioji; Makoto Ogasawara; Hiroo Inata, both of Hino, all of Japan

[73] Assignee: Teitin Limited, Osaka, Japan

[21] Appl. No.: 162,576

[22] Filed: Jun. 24, 1980

[30] Foreign Application Priority Data

Jun. 25, 1979 [JP] Japan ................................. 54-79050
Sep. 25, 1979 [JP] Japan ................................ 54-121926
Sep. 25, 1979 [JP] Japan ................................ 54-121927

[51] Int. Cl.$^3$ ...................... B29C 17/02; C08G 63/02
[52] U.S. Cl. ................................. 264/290.2; 528/193
[58] Field of Search ...................... 264/290.2; 528/193

[56] References Cited

U.S. PATENT DOCUMENTS

| | | | |
|---|---|---|---|
| 3,637,595 | 1/1972 | Cottis et al. | 528/194 |
| 3,778,410 | 12/1973 | Kuhfuss et al. | 260/47 C |
| 3,980,749 | 9/1976 | Cottis et al. | 264/331 |
| 4,064,108 | 12/1977 | Inata et al. | 528/193 |

FOREIGN PATENT DOCUMENTS

| | | |
|---|---|---|
| 52-117973 | 10/1977 | Japan . |
| 53-86798 | 7/1978 | Japan . |
| 54-93041 | 7/1979 | Japan . |
| 54-132674 | 10/1979 | Japan . |

*Primary Examiner*—V. P. Hoke
*Attorney, Agent, or Firm*—Sherman & Shalloway

[57] ABSTRACT

A melt-molded film of a wholly aromatic polyester, said film having in its plane two perpendicularly crossing directions in each of which the Young's modulus and strength of the film at 25° C. are at least about 200 kg/mm$^2$ and at least about 5 kg/mm$^2$ respectively, the product of the Young's moduli of the film in the two directions being at least $8 \times 10^4$ (kg/mm$^2$)$^2$, and said wholly aromatic polyester being substantially linear, having a melt viscosity at about its melting point of at least about 10000 poises, and being composed substantially of recurring units derived from p-hydroxybenzoic acid, recurring units derived from a m- or p-oriented aromatic dicarboxylic acid and recurring units derived from a m- or p-oriented aromatic dihydroxy compound, the proportion of said recurring units derived from p-hydroxybenzoic acid being about 30 to about 70 mole % based on the entire recurring units. This invention provides also a process for producing said film which comprises heating aforesaid wholly aromatic polyester to a temperature above a point at which the polyester is extrusion-moldable and extruding the heated polyester through a slit; and either (i) orienting the extruded film in the extruding direction or machine direction and a direction perpendicular thereto while the heated aromatic polyester resides in said slit or after it has left the slit but before it is cooled to the glass transition temperature of the polyester, of (ii) orienting the extruded film substantially only in the extruding direction or machine direction while the polyester heated at said temperature resides in the slit, or after it has left the slit but before it is cooled to the glass transition temperature of the polyester, and then re-heating the film to a temperature higher than the glass transition temperature of the polyester, and orienting the film in a direction perpendicular to the machine direction.

19 Claims, No Drawings

BIAXIALLY ORIENTED WHOLLY AROMATIC POLYESTER FILM

This invention relates to a film composed of a wholly aromatic polyester having optical anisotropy in the molten state. More specifically, this invention relates to a melt-molded biaxially oriented film of a substantially linear wholly aromatic polyester having a high melt viscosity.

A method has previously been known for producing a substantially monoaxially oriented film by melt-molding a substantially linear aromatic polyester having optical anistropy in the molten state (Japanese Laid-Open Patent Publication No. 86798/78, and U.S. Pat. No. 4,118,372).

U.S. Pat. No. 3,778,410 discloses a method for producing various polyesters, including those having optical anisotropy, which are soluble in a mixture of phenol and tetrachloroethane, said method comprising contacting various polyesters composed of aromatic dicarboxylic acids and diols with acyloxy aromatic monocarboxylic acids. The U.S. Patent states that some of the polyesters prepared in this manner are suitable for production of biaxially oriented films. The specification of the U.S. Patent, however, fails to disclose or suggest which of these polyesters are suitable for production of biaxially oriented films.

Investigations of the present inventors have shown that it is virtually impossible to obtain biaxially oriented films from polyesters, especially wholly aromatic polyesters having optical anisotoropy, which are soluble in a mixture of tetrachloroethane and phenol and are disclosed in the specification of U.S. Pat. No. 3,778,410, and even if a biaxially oriented film is produced by operating with utmost care, sufficient orientation cannot be achieved in one direction and the film does not have sufficient mechanical properties.

Japanese Laid-Open Patent Publication No. 117,973/77 discloses an electrically insulating film stretched to at least 1.01 times in at least one direction which is prepared by melt molding an optically anisotropic aromatic polyester having a melt viscosity of not more than 10000 poises and composed substantially of an aromatic dicarboxylic acid or alicyclic discarboxylic acid and an aromatic diol. The melt viscosity of such a polyester composed substantially of a dicarboxylic acid and a diol is not so high, and it is practically impossible to prepare from it a fully biaxially oriented film having sufficient mechanical properties, especially such a strength as to cause it to withstand use at a temperature of, for example, more than 200° C., as can be seen from the fact that a working example in the aforesaid Japanese Publication only describes a film stretched to about 1.04 times both in the machine and transverse directions.

As is seen in the above-described prior art, it is difficult or substantially impossible to prepare a substantially biaxially oriented film from optically anisotropic aromatic polyesters, especially wholly aromatic polyesters, having a relatively low melt viscosity. In view of this state of the art, an attempt was made to impart mechanical properties to films by crosslinking an optically anisotropic wholly aromatic polyester with molecular oxygen, etc., and press-forming the polyester without performing an orienting operation such as stretching (see U.S. Pat. No. 3,980,749).

Furthermore, in view of the fact that in the aforesaid prior art, it is difficult or substantially impossible to produce a substantially biaxially oriented film by melt molding an optically anisotropic wholly aromatic polyester having a relatively low melt viscosity, a method was also suggested for producing a film which comprises forming a solution of such a wholly aromatic polyester in an organic solvent into a film substantially non-oriented in any direction, and then biaxially stretching the resulting film (see Japanese Laid-Open Patent Publication No. 93041/79). If, however, the melt viscosity, i.e. the degree of polymerization, of the wholly aromatic polyester is high, it is difficult or impossible to dissolve such a polyester in an organic solvent. Accordingly, the method involving forming a solution of an optically anisotropic wholly aromatic polyester in an organic solvent can afford only a film composed of a wholly aromatic polyester having a relatively low degree of polymerization.

Investigations of the present inventors have shown that such a film obtained by a film-forming method using a solvent does not have sufficient mechanical properties, especially at high temperatures, in spite of its being biaxially oriented.

It is an object of this invention therefore to provide a film of a substantially linear optically anisotropic wholly aromatic polyester by melt molding.

Another object of this invention is to provide a biaxially oriented melt-molded film composed of a substantially linear optically anisotropic wholly aromatic polyester having a melt viscosity at about its melting point of at least about 10000 poises.

Still another object of this invention is to provide a melt-molded film composed of an optically anisotropic wholly aromatic polyester and having in its plane two perpendicularly crossing directions in each of which the Young's modulus and strength of the film at 25° C. are at least about 200 kg/mm$^2$ and at least about 5 kg/mm$^2$ respectively, the product of the Young's moduli of the film in the two directions being at least $8\times10^4$ (kg/mm$^2$)$^2$.

Still another object of this invention is to provide a thermally stable film of an optically anisotropic wholly aromatic polyester which has such a strength that it can fully withstand use at a temperature of at least 200° C.

Still another object of this invention is to provide a thermally stable film of a wholly aromatic polyester which can fully withstand use at a high temperature for a long period of time, for example at 180° C. for 20000 to 30000 hours.

Yet another object of this invention is to provide a film of a wholly aromatic polyester which has a very low heat shrinkage at a high temperature of, for example, 260° C.

A further object of this invention is to provide a process for forming a film having such superior properties as described above from a melt of an optically anisotropic wholly aromatic polyester.

Other objects and advantages of this invention will become apparent from the following description.

In accordance with this invention, these objects and advantages are achieved by a melt-molded film of a wholly aromatic polyester, said film having in its plane two perpendicularly crossing directions in each of which the Young's modulus and strength of the film at 25° C. are at least about 200 kg/mm$^2$ and at least about 5 kg/mm$^2$ respectively, the product of the Young's moduli of the film in the two directions being at least $8 \times 10^4$ (kg/mm$^2$)$^2$, and said wholly aromatic polyester being substantially linear, having a melt viscosity at about its melting point, defined by equation (1) below, of at least about 10000 poises, and being composed substantially of recurring units derived from p-hydroxybenzoic acid, recurring units derived from a m- or p-oriented aromatic dicarboxylic acid and recurring units derived from a m- or p-oriented aromatic dihydroxy compound, the proportion of said recurring units derived from p-hydroxybenzoic acid being about 30 to about 70 mole% based on the entire recurring units.

Unless otherwise specified, the melt viscosity ($\eta_a$) of the film at about its melting point in this invention is defined by the following equation (1).

$$\eta_a = \pi p r^4 / 8lQ \tag{1}$$

wherein $\eta_a$ is the melt viscosity of a wholly aromatic polyester sample determined by packing about 1 g of a powder of the wholly aromatic polyester sample in a cylinder having a cross-sectional area of 1 cm$^2$ and equipped with a nozzle having a diameter of 1 mm and a length of 5 mm centrally at its bottom portion, extruding the polyester under pressure from the nozzle at about its melting point, and measuring the melt viscosity of the polyester when the shear rate (sec$^{-1}$) defined by the following equation (2)

$$\gamma_a = 4Q/\pi r^3 \tag{2}$$

reaches 100 sec$^{-1}$; p is the pressure (dyne/cm$^2$) applied; r is the radius ($\equiv$0.05 cm) of the nozzle; l is the length ($\equiv$0.5 cm) of the nozzle; and Q is the rate (cc/sec) of the polyester extruded.

The wholly aromatic polyester used in this invention is composed substantially of recurring units derived from p-hydroxybenzoic acid, recurring units derived from a m- or p-oriented aromatic dicarboxylic acid and recurring units derived from a m- or p-oriented aromatic dihydroxy compound, and shows optical anisotropy in the molten state. The proportion of the recurring units derived from p-hydroxybenzoic acid is about 30 to about 70 mole% of the entire recurring units.

Optical anisotropy in the molten state means that the molten polyester permits passage of polarized light in an optical system equipped with polarizers crossing each other at an angle of 90 degrees.

The wholly aromatic polyester in this invention is composed, for example, of the following recurring units.

The recurring units derived from p-hydroxybenzoic acid is represented by the following formula (A$_o$).

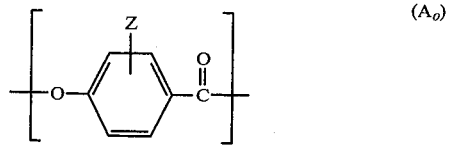

wherein Z represents a hydrogen atom, a halogen atom, an alkyl group having 1 to 6 carbon atoms, an alkoxy group having 1 to 6 carbon atoms, a phenyl group, or a phenyl group having at least one substituent selected from halogen atoms, alkyl groups having 1 to 6 carbon atoms and alkoxy groups having 1 to 6 carbon atoms.

Chlorine and bromine atoms are the preferred halogen atom. The alkyl group having 1 to 6 carbon atoms may be linear or branched, and includes, for example, methyl, ethyl, n-propyl, iso-propyl, n-butyl, iso-butyl, t-butyl, and n-hexyl. Methyl and ethyl are preferred.

The alkoxy group having 1 to 6 carbon atoms may be linear or branched, and includes, for example, methoxy, ethoxy, n-propoxy, n-butoxy, iso-butoxy, t-butoxy, and n-hexoxy. Methoxy and ethoxy groups are preferred.

The substituted phenyl group may, for example, be a phenyl group substituted with the above-exemplified groups.

Preferred recurring units of formula (A$_o$) are those in which Z represents hydrogen or phenyl, especially hydrogen.

These recurring units of formula (A$_o$) are derived from 4-hydroxybenzoic acids such as p-hydroxybenzoic acid, 3-phenyl-4-hydroxybenzoic acid, 3-chloro-4-hydroxybenzoic acid, 3-bromo-4-hydroxybenzoic acid, 3-methoxy-4-hydroxybenzoic acid, 3-ethoxy-4-hydroxybenzoic acid, 2-methyl-4-hydroxybenzoic acid, 3-methyl-4-hydroxybenzoic acid, and 3-ethyl-4-hydroxybenzoic acid, or the functional derivatives thereof.

The recurring units derived from a m- or p-oriented aromatic dicarboxylic acid are represented by the following formula (B$_o$)

wherein U represents a divalent m- or p-oriented aromatic radical such as a phenylene, naphthylene or biphenylene group which may be substituted by at least one substituent that is the same as Z defined in formula (A$_o$) above, on each 6-membered aromatic ring forming the aromatic radical. In the above formula, the p-oriented aromatic radical denotes an aromatic radical, such as 1,4-phenylene, 1,4-naphthylene or 4,4'-biphenylene, in which the two bonds of the aromatic radical extend in opposite directions coaxially from the aromatic ring, or an aromatic radical, such as a 1,5-naphthalene, 2,6-naphthalene or 3,3'-(or 3,5')-biphenylene group, in which these bonds extend in opposite directions along parallel axes. The m-oriented aromatic radical denotes an aromatic radical, such as 1,3-phenylene, 1,3-, 1,6-, 1,7- or 2,7-naphthylene, or 3,4'-biphenylene, in which the two bonds of the aromatic radical are not adjacent to each other, and do not extend coaxially or along parallel axes from the aromatic ring.

These recurring units of formula (B$_o$) are derived from m-oriented aromatic dicarboxylic acids such as isophthalic acid, naphthalene-1,3-dicarboxylic acid, naphthalene-1,6-dicarboxylic acid, naphthalene-1,7-dicarboxylic acid, naphthalene-2,7-dicarboxylic acid, diphenyl-3,4'-dicarboxylic acid, diphenylether-3,4'-dicarboxylic acid, diphenoxyethane-3,4'-dicarboxylic acid, 5-methylisophthalic acid, 4-methylisophthalic acid, 5-tert.butylisophthalic acid, 5-methoxyisophthalic acid, diphenylether-4,4'-dichloro-3,4'-dicarboxylic acid and naphthalene-2,7-dichloro-1,6-dicarboxylic acid or the functional derivatives thereof; or p-oriented aromatic dicarboxylic acids such as terephthalic acid, naphthalene-1,4-dicarboxylic acid, naphthalene-1,5-dicarboxylic acid, naphthalene-2,6-dicarboxylic acid, diphenyl-4,4'-dicarboxylic acid, diphenyl-3,3'-dicarboxylic acid, diphenoxyethane-4,4'-dicarboxylic acid, diphenylether-4,4'-dicarboxylic acid, methylterephthalic acid, methoxyterephthalic acid, chloroterephththalic acid, 4-chloro-naphthalene-2,7-dicarboxylic acid, diphenylether-2,2′-dimethyl-4,4′-dicarboxylic acid, and diphenoxyethane-2,2′-dichloro-4,4′-dicarboxylic acid, or the functional derivatives thereof.

The recurring units derived from a p- or m-oriented aromatic dihydroxy compound are represented by the following formula ($C_o$)

wherein Y represents a divalent m- or p-oriented aromatic group radical having the same definition as U in formula ($B_o$) and may have Z defined in formula ($A_o$) as a substituent.

These recurring units of formula ($C_o$) are derived from p-oriented aromatic dihydroxy compounds such as hydroquinone, 4,4′-dihydroxydiphenyl, 4,4′-dihydroxydiphenyl ether, 4,4′-dihydroxydiphenoxyethane, 3,3′-dihydroxydiphenyl, 3,3′-dihydroxydiphenyl ether, 3,3′-dihydroxydiphenoxyethane, 1,5-dihydroxynaphthalene, 2,6-dihydroxynaphthalene, 1,4-dihydroxynaphthalene, chlorohydroquinone, bromohydroquinone, methylhydroquinone, ethylhydroquinone, phenylhydroquinone, 2,2′-dimethyl-4,4′-dihydroxydiphenyl 3,3′-dimethoxy-4,4′-dihydroxydiphenyl ether, 1,2-(2-chloro-4-hydroxyphenoxy)ethane, 1,2-(2-bromo-3-hydroxyphenoxy)ethane and 4-methoxy-2,6-dihydroxynaphthalene or the functional derivatives thereof m-oriented aromatic dihydroxy compounds such as resorcinol, 3,4′-dihydroxydiphenyl, 3,4′-dihydroxydiphenyl ether, 3,4′-dihydroxydiphenoxyethane, 1,3-dihydroxynaphthalene, 1,6-dihydroxynaphthalene, 1,7-dihydroxynaphthalene, 2,7-dihydroxynaphthalene, 4-chlororesorcinol, 4-bromoresorcinol, 4-methylresorcinol, 4-phenylresorcinol, 4-ethoxyresorcinol, 4,3′-dimethoxy-3,4′-dihydroxydiphenyl, 4,3′-dimethoxy-3,4′-dihydroxydiphenyl ether, 4,3′-dichloro-3,4′-dihydroxydiphenyl ether, 2,5-dichloro-1,6-dihydroxynaphthalene and 4-methoxy-2,7-dihydroxynaphthalene or the functional derivatives thereof.

When the recurring units of formula ($B_o$) are derived from m-oriented aromatic dicarboxylic acids, Y in the recurring units of formula ($C_o$) is preferably a p-oriented aromatic group. When the recurring units ($B_o$) are derived from p-oriented aromatic dicarboxylic acids, Y in the recurring units of formula ($C_o$) is preferably a m-oriented aromatic group. The first-mentioned combination is especially preferred.

Most preferred is a combination of the recurring units of formula ($B_o$) in which U represents a 1,3-phenylene, 2,7-naphthylene or 3,4′-biphenylene group or a substitution product thereof, especially 1,3-phenylene, and the recurring units of formula ($C_o$) in which Y is 1,4-phenylene, 1,4-naphthylene, 1,5-naphthylene, 2,6-naphthylene, 4,4′-biphenylene, 3,3′-(or 3,5′)biphenylene or a substitution product thereof.

The wholly aromatic polyester in accordance with this invention composed of the aforesaid recurring units contains about 30 to about 70 mole%, preferably about 35 to about 60 mole%, based on the entire recurring units, of recurring units derived from p-hydroxybenzoic acid as defined in formula ($A_o$).

Accordingly, a preferred wholly aromatic polyester for use in this invention is composed substantially of (A) recurring units derived from p-hydroxybenzoic acid, (B) recurring units derived from a m- or p-benzenedicarboxylic acid, and (C) recurring units derived from at least one m- or p-oriented aromatic dihydroxy compound selected from m- or p-dihydroxybenzene and 4,4′-, 4,3′- or 3,3′-dihydroxydiphenyl, in which the proportion of the recurring units (A) is about 30 to about 70 mole% based on the entire recurring units, and the mole ratio of the recurring units (B) to the recurring units (C) is 1:0.95–1.05. Desirably, recurring units derived from 4,4′-, 4,3′- or 3,3′-dihydroxydiphenyl is present together with the recurring units derived from dihydroxybenzene.

More preferred wholly aromatic polyesters are those which consist substantially of recurring units derived from p-hydroxybenzoic acid, recurring units derived from terephthalic acid and/or isophthalic acid and recurring units derived from at least one aromatic dihydroxy compound selected from the group consisting of hydroquinone, resorcinol, chlorohydroquinone and methylhydroquinone. Especially preferred wholly aromatic polyesters are those which consist substantially of recurring units derived from p-hydroxybenzoic acid, recurring units derived from isophthalic acid and recurring units derived from hydroquinone, and those which consist substantially of recurring units derived from p-hydroxybenzoic acid, recurring units derived from terephthalic acid and recurring units derived from resorcinol, above all the former.

The wholly aromatic polyesters used in this invention are characterized by the fact that they are optically anisotropic in the molten state, and their molecular chains are readily aligned in the flowing direction in the molten state.

The wholly aromatic polyesters used in this invention are also characteristic in that they have such a high degree of polymerization as is represented by a melt viscosity, as defined by equation (1), of at least about 10000 poises preferably about 15000 to about 500000 poises, more preferably about 20000 to about 100000 poises. Such optically anisotropic wholly aromatic polyesters having a high degree of polymerization have scarcely been considered suitable as materials for production of biaxially oriented films by melt-molding in view of their melt-moldability.

The present invention is thus unexpected because it can provide biaxially oriented films having superior mechanical properties by film-forming from melts of optically anisotropic wholly aromatic polyesters having such a high degree of polymerization whose molecular chains are readily aligned in the following direction.

Investigations of the present inventors have shown that wholly aromatic polyesters having such a high degree of polymerization can be produced advantageously by the following methods.

(i) A m- or p-oriented aromatic dicarboxylic acid, a functional derivative of a m- or p-oriented aromatic dihydroxy compound and a functional derivative at the hydroxyl group of p-hydroxybenzoic acid are polycondensed in the molten state; or (ii) a functional derivative of a m- or p-oriented aromatic dicarboxylic acid, a m- or p-oriented aromatic dihydroxy compound and a functional derivative at the carboxyl group of p-hydroxybenzoic acid are polycondensed in the molten state. The resulting polymer having a low degree of polymerization is then polymerized in the solid phase.

These methods are described hereinbelow.

The characteristic feature of the method in accordance with this invention is that a polymer having a relatively low degree of polymerization is produced by polycondensation in the molten state, and then polymerized in the solid phase to form a polymer having a high degree of polymerization, and by such a procedure, a substantially linear polymer having a high melt viscosity can be produced within a period of time which is relatively short for production of wholly aromatic polyesters.

Polymers having a high degree of polymerization are difficult to produce by a melt-polymerization method which has frequently been used in the past for production of wholly aromatic polyesters. If it is desired to produce polymers of high degrees of polymerization, polycondensation must be performed at high temperatures for a very long period of time. Such a method can only give polymers having poor film-formability, i.e. possibly crosslinked polymers which when melted and taken up as a film, will break.

The polycondensation in the molten state mentioned in (i) above is carried out by heating the m- or p-oriented aromatic dicarboxylic acid, the functional derivative of a m- or p-oriented aromatic dihydroxy compound and the functional derivative at the hydroxyl group of p-hydroxybenzoic acid in predetermined amounts at a temperature of generally about 250° to about 340° C. preferably 270° C. to 320° C. in the presence or absence of a polycondensation catalyst, preferably in the absence of such a catalyst. The melt polycondensation is usually carried out at atmospheric pressure in an atmosphere of an inert gas such as nitrogen in the early stage, for example until the polymerization conversion reaches about 50%. Then, the pressure of the reaction system is gradually reduced, and finally the polycondensation is carried out at a reduced pressure of not more than about 10 mmHg, preferably not more than about 5 mmHg, until the melt viscosity of the polymer reaches about 100 to about 3000 poises, preferably about 400 to about 2000 poises. The melt viscosity of the polymer is as defined by equation (1) at a shear rate of 1000 sec$^{-1}$.

After the desired melt viscosity has been reached, a stabilizer, for example an oxy acid of phosphorus or the esters thereof such as phosphorous acid, phosphoric acid, trimethyl phosphate, triethyl phosphate, triphenyl phosphate or triphenyl phosphite, may be added to the polycondensation system, as required.

Examples of the m- or p-oriented aromatic dicarboxylic acid used in the polycondensation may be the same as those already given in the above description of the recurring units.

Examples of the functional derivatives of the m- or p-oriented aromatic dihydroxy compound of p-hydroxybenzoic acid include esters formed between the m- or p-oriented aromatic dihydroxy compound or p-hydroxybenzoic acid (specific examples of these are already given hereinabove in the description of the recurring units) and organic monocarboxylic acids, preferably aliphatic monocarboxylic acids having 1 to 6 carbon atoms, especially preferably acetic acid.

These compounds are used such that the mole ratio of the aromatic dihydroxy compound to the aromatic dicarboxylic acid is from about 1 to about 1.1, preferably from about 1 to about 1.05.

The polycondensation reaction proceeds while byproducts such as an organic monocarboxylic acid resulting from ester interchange reaction are distilled off in the early stage of the reaction. Hence, the reaction conversion can be determined by the amount of such distillates.

The polycondensation reaction in the molten state described in (i) above can also be performed while forming the functional derivatives of the p-hydroxybenzoic acid and aromatic dihydroxy compound in situ in the polycondensation system. In this case, about 1 to about 5 moles, preferably about 1.5 to about 4 moles, per equivalent of the hydroxyl groups in p-hydroxybenzoic acid and aromatic dihydroxy compound, of an organic monocarboxylic acid anhydride such as acetic anhydride is caused to be present in the reaction system together with the p-hydroxybenzoic acid, aromatic dicarboxylic acid and aromatic dihydroxy compound.

The melt polycondensation described in (ii) above is carried out by heating the functional derivative of a m- or p-oriented dicarboxylic acid, a m- or p-oriented aromatic dihydroxy compound and a functional derivative at the carboxyl group of p-hydroxybenzoic acid in predetermined amounts generally at a temperature of about 250° to about 340° C. preferably about 270° C. to about 320° C. in the presence or absence of a polycondensation catalyst, preferably in the presence of a catalyst.

The polycondensation is carried out at atmospheric pressure or under reduced pressure until the melt viscosity of the polymer reaches about 400 to about 2000 (at a shear rate of 1000 sec$^{-1}$) in the same way as in the polycondensation reaction described in (i) above.

Examples of the polycondensation catalyst are compounds containing elements such as titanium, tin, lead, antimony, bismuth, cerium, lanthanum, lithium, sodium, potassium, zinc, manganese, cobalt and magnesium. Specific examples include titanium tetrabutoxide, titanyl oxalate, stannous acetate, stannous benzoate, stannous chloride, dibutyltin oxide, lead oxide, antimony trioxide, antimony acetate, antimony pentoxide, bismuth trioxide, cerium acetate, lanthanum oxide, lithium oxide, sodium acetate, potassium benzoate, zinc carbonate, manganese acetate, cobalt acetate and magnesium acetate. Of these, the tin compounds and antimony compounds are preferred.

The amount of the polycondensation catalyst is preferably 0.01 to 0.1 mole% based on the sum of the aromatic dicarboxylic acid component and the p-hydroxybenzoic acid component constituting the polyester.

After the desired melt viscosity has been reached, the same stabilizer as described above can be added to the polycondensation system, as required.

The functional derivatives of the m- or p-oriented dicarboxylic acid or p-hydroxybenzoic acid at its carboxyl group are, for example, esters formed between the m- or p-oriented dicarboxylic acid or p-hydroxybenzoic acid and aromatic monohydroxy compounds, preferably substituted or unsubstituted phenols such as phenol, m-cresol, p-cresol, preferably phenol.

The ester of p-hydroxybenzoic acid is usually represented by the formula

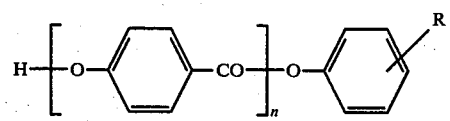

wherein n is a number of from 1 to 1.5, and R is hydrogen or lower alkyl such as methyl.

Examples of the m- or p-oriented aromatic dihydroxy compound may be the same as those already given hereinabove in the description of the recurring units.

The melt polycondensation (ii) can also be performed while forming the functional derivatives of p-hydroxybenzoic acid and aromatic dicarboxylic acid in situ in the polycondensation system. In this case, an aromatic monohydroxy compound such as substituted or unsubstituted phenol or its ester with an organic monocarboxylic acid such as aliphatic monocarboxylic acids having 1 to 6 carbon atoms (e.g., acetic acid) may be caused to be present in the reaction system together with the p-hydroxybenzoic acid, aromatic dicarboxylic acid and aromatic dihydroxy compound. In this case, it is possible to substantially form an ester between the p-hydroxybenzoic acid and the aromatic monohydroxy compound by using a lower temperature (e.g., about 200° C.) than is required for polycondensation, then raise the temperature gradually to 250° to 280° C., for example, thereby substantially forming an ester between the aromatic dicarboxylic acid and the aromatic monohydroxy compound, and to raise the temperature of the reaction gradually to at most 340° C., preferably at most 320° C., under reduced pressure until the desired melt viscosity is reached.

The second melt polycondensation can also be carried out in situ while forming an ester between the p-hydroxybenzoic acid and aromatic monohydroxy compound in situ by causing an aromatic monohydroxy compound or its ester with an organic monocarboxylic acid to be present in the reaction system together with the p-hydroxybenzoic acid, aromatic dihydroxy compound and the functional derivative of aromatic dicarboxylic acid.

One modification of this method comprises first reacting the p-hydroxybenzoic acid with the aromatic monohydroxy compound or its ester with an organic monocarboxylic acid, then adding the functional derivative of the aromatic dicarboxylic acid and the aromatic dihydroxy compound to the reaction system, and then polycondensing these materials.

The method described in (ii) is preferred as a method for melt polymerization in this invention. The method (ii) has the advantage over the method (i) in that wholly aromatic polyesters having a lower terminal carboxyl group content and reduced coloration can be obtained.

The wholly aromatic polyester having a high melt viscosity which is used in this invention can be prepared by polymerizing the polymer obtained by the melt polycondensation and having a melt viscosity (at a shear rate of 1000 sec$^{-1}$) of about 100 to about 3000 poises in the solid phase.

As is well known in the solid-phase polymerization for aromatic polyesters, the solid-phase polymerization generally brings about the desired degree of polymerization more rapidly as the particle size of the polymer is smaller. Accordingly, such solid-phase polymerization is carried out using polymer particles having a particle size smaller than 5 mesh (Tyler's mesh), preferably 6 to 300 Tyler's mesh. Too small particle sizes are undesirable because of the increasing difficulty of pulverization or handling.

The solid-phase polymerization is carried out usually at a temperature at which the wholly aromatic polyester is maintained solid, preferably at a temperature at which the polymer particles do not agglomerate to such an extent that they do not easily separate from each other, for example at a temperature lower than the flow initiation temperature of the wholly aromatic polyester, usually in an atmosphere of an inert gas such as nitrogen at atmospheric pressure or reduced pressure, preferably under a reduced pressure of, for example, not more than 1 mmHg. Since the flow initiation temperature becomes higher as the solid-phase polymerization proceeds, the temperature of the solid-phase polymerization can be raised as required with the progress of the solid-phase polymerization.

The flow initiation temperature, which is one measure of the solid-phase polymerization temperature of the wholly aromatic polyester, can be easily determined by the method described hereinbelow.

For example, a wholly aromatic polyester having a melt viscosity of 500 poises (at a shear rate of 1000 sec$^{-1}$) and obtained by melt polymerization and composed of 42 mole% of units derived from p-hydroxybenzoic acid, 29 mole% of units derived from isophthalic acid and 29 mole% of units derived from hydroquinone has a flow initiation temperature of about 270° C. Accordingly, this polymer can be polymerized in the solid phase at a temperature of about 230° to about 260° C.

According to the aforesaid method of polymerization in accordance with this invention, a substantially linear wholly aromatic polyester having a melt viscosity at about its melting point of at least about 10000 poises can be produced advantageously.

Investigations of the present inventors have shown that a wholly aromatic polyester having a melt viscosity of about at least about 10000 poises composed substantially of, for example, p-hydroxybenzoic acid units, isophthalic acid units and hydroquinone units has an n (flow index) determined from the following well known general formula representing the relation between the shear stress and the shear rate.

$$\text{Constant} = \frac{\text{shear stress}}{(\text{shear rate})^n}$$

of about 0.8 to about 1 when the shear rate is about 100 sec$^{-1}$, and therefore, that the dependence of the melt viscosity on the shear rate is very small for polymers having optical anisotropy.

To the best of the knowledges of the present inventors, there has been no previous report on the dependence of the melt viscosity of an optically anisotropic polymer on the shear rate. The present inventors know that it was previously reported that an optically anisotropic aramide, for example, p-xylene terephthalmide polymer, has a great dependence of its viscosity on the shear rate so that such an aramide is very difficult to mold into a film.

The small dependence of the melt viscosity on the shear rate is probably one reason why the aromatic polyester obtained by the polycondensation method of this invention has good film-formability and gives a film having very good properties.

The wholly aromatic polyester film of this invention has a high tensile strength and a high Young's modulus in biaxial directions, and when it is heat treated, a film having a very low shrinkage at a high temperature of, say, 260° C., can be obtained. Hence, the film of this invention show thermal stability such that it can fully withstand use for 20000 to 30000 hours at a temperature of, for example, 180° C. It also retains a strength of at least 1 kg/mm$^2$ even at a temperature of as high as 250° C.

The wholly aromatic polyester films of this invention are useful in various applications such as electrically insulating films, films for flexible printed circuit boards, magnetic tapes and films for vacuum deposition of metal because of their superior thermal stability and mechanical properties.

The process for preparing the wholly aromatic polyester film of this invention comprises (A) heating a wholly aromatic polyester having a melt viscosity, at about its melting point, of at least about 10000 poises to a temperature above a point at which it is extrusion-moldable, and extruding it through a slit, and (B) either (i) orienting the aromatic polyester heated at the aforesaid temperature in the extrusion direction and a direction at right angles thereto during its residence in the slit, (ii) orienting the polyester in the machine direction and a direction at right angles thereto after the polyester has left the slit but before it is cooled to its glass transition temperature, or (iii) orienting the polyester substantially in the machine or extrusion direction during its residence in the slit, or after it has left the slit but before it is cooled to its glass transition temperature, and the re-heating it to a temperature higher than the glass transition temperature and orienting it in a direction at right angles to the aforesaid machine direction.

Commonly, these procedures involve heating the wholly aromatic polyester to a temperature above a point at which the polyester is extrusion-moldable, extruding the heated polyester through a slit, and orienting it in the machine direction and a direction at right angles thereto.

According to a first procedure, the polymer is oriented in the two directions while it resides in the slit. In this procedure, the orientation in the take-up direction is achieved by the flow of the polymer in a certain fixed direction under shear within the slit and by tension in the machine direction when the polymer is on the verge of leaving the slit. The orientation in a direction at right angles to the machine direction is achieved by imparting a motion which produces a relative velocity difference between slit-forming members to which the opposite surfaces of the slit belong, for example between an inside member and an outside member of an annular slit.

According to this procedure, the polymer heated to an extrusion-moldable temperature undergoes shear while being oriented in the extruding direction within the slit, and is also oriented in a direction at right angles thereto, followed by take-up.

Such an annular slit is described, for example, in Japanese Laid-Open Patent Publication No. 132674/79. This type of annular slit can also be used in the process of this invention. Preferably, the land length (L) of the slit is about 10 to about 20 times the slit width (W). The slit width is preferably about 0.5 to 5 mm.

The shear stress given to the polymer by the relative motion of members forming the slit is determined such that the shear rate in a direction at right angles to the extruding direction is at least 2 times, preferably at least 5 times, especially preferably at least 10 times, that in the extruding direction. In the same sense as above, this shear stress can be increased up to 100 times. If the shear stress is too low, orientation in the direction perpendicular to the extruding direction cannot be fully achieved.

Desirably, the shear rate in the extruding direction is preferably about 30 to about 300 sec$^{-1}$. Generally, as the viscosity of the polymer during extrusion is higher it is advantageous to select lower shear rates within the aforesaid range.

Advantageously, the wholly aromatic polyester is extruded at a temperature between a temperature about 10° C. lower than the melting point of the polyester and a temperature about 50° C. higher than its melting point, irrespective of the method of film formation.

The procedure (ii) of film formation involves orienting the extruded polymer both in the machine direction and a direction at right angles thereto after the polymer has left the slit but before its temperature reaches its glass transition temperature, usually before it is wound up.

According to one embodiment of this second procedure, the wholly aromatic polyester is heated to a temperature above a point at which it is extrusion-moldable, and then extruded from an annular slit. Then, before the extruded annular film cools to its glass transition temperature, it is taken up while expanding it by maintaining the pressure of the inside of the film higher than that of the outside of the film, thereby to orient the film in the machine direction and a direction at right angles thereto.

Before the temperature of the extruded polymer reaches its glass transition point, the orientation of the polymer in the machine direction and the orientation of the polymer in a direction perpendicular thereto can be performed simultaneously or separately.

Specifically, the two orientations can be achieved simultaneously by introducing a gas into the inside of the annular film to maintain the pressure of the inside of the film higher than that of its outside, before the extruded annular film is cooled to its glass transition temperature. Or the two orientations can be performed separately by substantially orienting the extruded annular film in the machine direction before it is cooled to its glass transition temperature, and then orienting in a direction perpendicular to the machine direction the film substantially oriented in the machine direction by introducing a gas into the inside of the film to maintain the pressure of the inside of the film higher than that in its outside before such film is cooled to its glass transition temperature.

In performing the two orientations together it is preferred to take up the film at a draft ratio of about 1 to about 4 while expanding the film with a gas at a blow ratio of about 2 to about 10. Advantageously, the blow ratio is adjusted to at least two times the draft ratio. In performing the two orientations separately, it is advantageous to achieve the orientation in the machine direction at a draft ratio of about 2 to about 10, and then achieving the orientation in a direction perpendicular thereto at a blow ratio of about 1.5 to about 5.

Desirably, expanding the film by a gas is carried out such that the surface temperature of a part of the film which has reached its maximum expanded diameter in the first place is from a temperature about 10° C. higher than the glass transition point of the polymer to a temperature about 70° C. higher than its glass transition point.

The method of taking up the annular film while expanding it by introducing a gas into the inside of the film is a well known technique.

In this case, the L/W ratio of the slit is preferably about 5 to about 20, and its W is preferably about 0.5 to 5 mm.

According to another embodiment of the second procedure, the aforesaid two orientations can be achieved by heating the wholly aromatic polyester to a temperature above a point at which it is extrusion-moldable, extruding the heated polyester through a slit, substantially orienting the extruded film in the machine direction before the film reaches its glass transition temperature, and then mechanically extending the film substantially oriented in the machine direction in a direction at right angles to the machine direction before its temperature reaches the glass transition temperature.

According to this embodiment, the orientation in the machine direction can be advantageously achieved at a draft ratio of about 2 to about 10, and the orientation in a direction perpendicular to the machine direction can be achieved advantageously by extending the film to about 1.5 to about 5 times. During the extending operation, the surface temperature of the film is desirably between a temperature about 10° C. higher than the glass transition point of the polymer and a temperature about 90° C. higher than the glass transition point.

Both a T-die slit and an annular slit can be used as the slit. When the annular slit is used, the annular film may be extended by mechanical means as such (in which case it is extended as if two films are laid one on top of the other), or after it has been cut open into one or two films.

The mechanical means used to perform such extension by extending the film while holding its ends is well known to those skilled in the art as for example a tender.

The procedure (iii) comprises heating the wholly aromatic polyester to a temperature above a point at which it is extrusion-moldable, extruding the heated polyester through a slit to obtain a film substantially oriented in the machine direction alone, re-heating the resulting film to a temperature higher than its glass transition point, and stretching it in a direction at right angles to the machine direction, thereby orienting the film both in the machine direction and the direction perpendicular thereto.

Preferably, the take-up is carried out at a draft ratio of about 2 to about 10. The re-heating temperature is between a temperature about 10° C. higher than the glass transition point of the polyester and a temperature about 90° C. higher than the glass transition point, and preferably the film is stretched to about 1.5 times to about 5 times a direction perpendicular to the machine direction at this temperature.

The procedures (ii) and (iii) are preferred in the process of producing the film of this invention, and the procedure (iii) and the second embodiment of the procedure (ii) are especially preferred.

Since the optically anisotropic wholly aromatic polyester film obtained by the process of this invention has very good state of molecular alignment as compared with conventional films of the same kind, it has excellent physical properties, particularly a high Young's modulus and a high tensile strength. Desirably, such a film has a thickness of not more than 2000$\mu$, preferably 10 to 2000$\mu$, especially 30 to 500$\mu$.

A film having a very low heat shrinkage at high temperatures can be obtained by heat-treating the resulting wholly aromatic polyester film under tension at a temperature between a temperature about 100° C. lower than the melting point of the polyester and a temperature about 30° C. lower than the melting point.

Thus, according to this invention, there is also provided a film composed of a wholly aromatic polyester having a high melt viscosity, which is biaxially oriented and therefore has the aforesaid physical properties in any of the two directions.

Specifically, there are provided a film having a strength of at least 10 kg/mm$^2$ and a Young's modulus of at least 200 kg/mm$^2$ at 25° C., the product of the Young's moduli of the film in the two directions being at least $8 \times 10^4$ (kg/mm$^2$)$^2$; preferably a film having a strength of at least 10 kg/mm$^2$ and a Young's modulus of at least 200 kg/mm$^2$ at 25° C., the product of the Young's moduli of the film in the two directions being at least $1 \times 10^5$ (kg/mm$^2$)$^2$; more preferably a film having a strength of at least 10 kg/mm$^2$ and a Young's modulus of at least 300 kg/mm$^2$ at 25° C., the product of the Young's moduli of the film in the two directions being at least $1 \times 10^5$ (kg/mm$^2$)$^2$; above all, a film having a strength of at least 15 kg/mm$^2$ and a Young's modulus of at least 400 kg/mm$^2$ at 25° C., the product of the Young's moduli of the film in the two directions being $2 \times 10^5$ to $4 \times 10^6$ (kg/mm$^2$)$^2$.

From another viewpoint, the present invention also provides a film having a degree of orientation of about 70 to about 90% in each of two perpendicularly crossing directions parallel to the plane of the film, the degree of orientation being determined by causing an X-ray to fall upon the film in the two directions respectively.

From still another viewpoint, the present invention also provides a film having a heat shrinkage of less than about 1% when heat-treated in the air at 260° C. for 5 minutes under no tension. The film having such a low heat shrinkage can be advantageously provided by heat-treating the film by the process of this invention.

The degree of orientation of the wholly aromatic polyester film of this invention is determined and defined as follows:

(1) Preparation of a sample

A number of rectangular film pieces having a width of about 0.5 mm and a length of about 1.5 cm are provided. They are stacked to provide an assembly having a thickness of about 3 mm. The assembly is fixed to a sample holder so that its stacked surface (cut surface) is exposed. At this time, the film pieces are prepared by cutting a film in a direction parallel to, or at right angles, to the machine direction.

The cut surface obtained by cutting in a direction parallel to the machine direction is called a side view surface of the film, and the cut surface obtained by cutting in a direction at right angles to the machine direction is called an end view surface of the film.

When the machine direction of the film is not known, it is determined as follows: An X-ray is irradiated onto the film surface in a direction perpendicular to the film surface, and a direction which shows a maximum diffraction intensity is determined by a X-ray diffraction photograph, and a direction perpendicular to this direction in the film plane is defined as the machine direction of the film.

(2) Measuring Method (i) The sample is mounted on a goniometer in an X-ray diffraction device so that the side view surface or end view surface of the sample is at right angles to the incident X-ray and the axis of the sample (the lengthwise direction of the rectangular sample fixed to the sample holder) is aligned in the perpendicular direction (gravity direction).

(ii) The goniometer is rotated in interlocking relation to a detector to locate a position at which the rotating angle ($2\theta$) of the detector gives a diffraction peak of a maximum intensity. The detector is then fixed at this position.

(iii) Then, the sample is rotated within a range of ±10° about the sample axis, and the sample axis is fixed at an angle which gives a maximum intensity.

(iv) The sample is rotated through 180° in the azimuth angle direction to the incident X-ray within a perpendicular plane, and a curve of intensity distribution of diffraction points is obtained.

(v) The degree of orientation ($\pi$) is determined from the following equation based on the resulting intensity distribution curve.

$$\pi(\%) = \frac{180° - H°}{180°} \times 100$$

wherein H° is the half-value width of the peak of the intensity distribution curve.

(3) Instrument Used

Model SG-9, a product of Rigaku Denki K.K.

(4) Measuring Conditions

40 KV×30 mA,
Cu K$_\alpha$ rays (1.542 A),
Nickel filter
Divergence slit: 2.00 mm in diameter
Scattering slit: 1°
Receiving slit: 0.3 mm The Young's modulus and strength of the film are measured by subjecting a film sample having a width of 5 mm and a length of 20 mm to an Instron tensile tester at a tensile speed of 100%/min.

The melting point, glass transition point, and flow initiation temperature of the wholly aromatic polyester are measured in the following manner.

Melting Point

The wholly aromatic polyester is heat-treated in a nitrogen atmosphere at about 250° C. for 4 hours, and then, the melting point of the polyester is measured by differential scanning calorimeter (DSC) at a temperature raising rate of 10° C./min.

Glass transition point

One gram of the wholly aromatic polyester is packed into a cylinder having a cross sectional area of 1 cm$^2$ and heated at a rate of 10° C./min. under a load of 100 kg/cm$^2$ using a flow tester. The apparent volume change of the polyester is observed, and the temperature at which the apparent volume of the polyester is minimum is defined as the glass transition point of the polyester.

Flow Initiation Temperature

Using a flow tester, 1 g of the wholly aromatic polyester is packed into a cylinder having a cross-sectional area of 1 cm$^2$ and equipped with a nozzle having a diameter of 1 mm and a length of 5 mm centrally at its bottom portion, and heated at a rate of 10° C./min. under a load of 100 kg/cm$^2$. The temperature at which the polymer begins to flow out from the nozzle is defined as the flow initiation temperature.

The following Examples illustrate the present invention in more detail.

In these examples, the inherent viscosities ($\eta_{inh}$) of the polymers were determined by dissolving 50 mg of a polymer sample in 10 ml of p-chlorophenol, and measuring the relative viscosity ($\eta_r$) of the polymer at 50° C., and calculating the inherent viscosity of the polymer from the following equation.

$$\eta_{inh} = \ln\eta_r/0.5$$

All parts in these examples are by weight.

EXAMPLE 1

115 parts of phenyl p-hydroxybenzoate, 114 parts of diphenyl isophthalate, 42 parts of hydroquinone and 0.089 part of stannous acetate were heated at 250° to 290° C. at atmospheric pressure. At this time, 70.7 parts of phenol distilled off. This corresponded to a conversion of 60%. Then, the pressure of the reaction system was gradually reduced, and the temperature was raised to 310° C. over 1 hour. After the pressure reached 20 mmHg, the melt polycondensation was further performed under this pressure for 50 minutes. The resulting polyester had an inherent viscosity of 1.05 and a flow initiation temperature of 270° C. The polyester was pulverized to a size of 12 to 24 mesh, and polymerized in the solid phase at 250° C. and 0.1 mmHg for hour. There was obtained a polyester with a high degree of polymerization and having a flow initiation temperature of 310° C. and a melt viscosity, at 360° C. and a shear rate of 100 sec$^{-1}$, of 75000 poises a flow index of 0.95 and a melting point of about 355° C. The polyester of a high degree of polymerization was heated at 150° C. for 10 hours to dry it, and extruded through a T-die having a slit with a width of 0.5 mm and a length of 100 mm at a cylinder temperature of 360° C. at a rate of 0.1 m/min. The extended film had a glass transition temperature of about 190° C. The extruded film was first extended to 5 times (draft ratio) in the machine direction (longitudinal direction) of the film in an atmosphere at 200° C. The resulting monoaxially oriented film having a surface temperature of about 250° C. was extended to 2 times in a direction perpendicular to the machine direction (i.e., the transverse direction). Finally, the film was heat-treated under tension at 290° C. for 30 seconds. The resulting film had a strength of 3.5 kg/mm$^2$ (MD) and 2.2 kg/mm$^2$ (TD) and a Young's modulus of 46 kg/mm$^2$ (MD) and 25 kg/mm$^2$ at 250° C. The degree of orientation, mechanical properties at 25° C. and dimensional stability of the resulting film are shown in Table 1.

EXAMPLE 2

A polyester with a high degree of polymerization having a flow initiation temperature of 310° C. and a melt viscosity, at 360° C. and a shear rate of 100 sec$^{-1}$, of 57000 poises a flow index of 0.94, and a melting point of about 355° C. was produced in the same way as in Example 1 except that the solid-phase polymerization was carried out at 250° C. and 0.1 mmHg for 6 hours. The polyester with a high degree of polymerization was extruded through an annular slit with a width of 1.5 mm and a diameter of 7 mm at a cylinder temperature of 360° C. and at a rate of 0.3 m/min. From an air inlet of a die equipped with the above slit, air under a pressure of 0.2 kg/cm$^2$ was introduced into the inside of the extruded annular film, and the film was taken up at a draft ratio of 2 in the machine direction and at a blow ratio of 6 in the transverse direction. The film was heat-treated under tension at 290° C. for 30 seconds. The resulting film had a strength of 3.2 kg/mm$^2$ (MD) and 2.1 kg/mm$^2$ (TD) and a Young's modulus of 30 kg/mm² (MD) and 24 kg/mm² (MD) at 250° C. The degree of orientation, mechanical properties at 25° C. and dimensional stability of the resulting film are shown in Table 1.

Infrared thermometer showed that the surface temperature of the annular film at a part which showed nearly a maximum diameter was about 250° C.

EXAMPLE 3

A polyester with a high degree of polymerization having a flow initiation temperature of 310° C. and a melt viscosity, at 360° C. and a shear rate of 100 sec$^{-1}$, of 64000 poises, a flow index of 0.95, and a melting point of about 355° C. was produced in the same way as in Example 1 except that the solid-phase polymerization was carried out at 250° C. and 0.2 mmHg for 7 hours. The polyester with a high degree of polymerization was extruded at a cylinder temperature of 360° C. through a T-die equipped with a slit having a width of 1 mm and a length of 100 mm at a rate of 0.1 m/min., and extended in the machine direction at a draft ratio of 4 in an atmosphere at 200° C. The film was re-heated to 250° C., and stretched to 3 times in the transverse direction at the same temperature. The film was finally heat-treated under tension at 290° C. for 30 seconds. The degree of orientation, mechanical properties and dimensional stability of the resulting film are shown in Table 1.

EXAMPLE 4

A polyester with a high degree of polymerization having a flow initiation temperature of 305° C. and a melt viscosity, at 360° C. and a shear rate of 100 sec$^{-1}$, of 20000 poises a flow index of 0.82 was produced in the same way as in Example 1 except that the solid-phase polymerization was carried out at 250° C. and 0.2 mmHg for 3.5 hours. The resulting polyester was formed into a film in the same way as in Example 3. The degree of orientation, mechanical properties and dimensional stability of the film are shown in Table 1.

EXAMPLE 5

A polymer having an inherent viscosity of 0.85 was produced by melt-polycondensation in the same way as in Example 1 except that 54 parts of phenyl p-hydroxybenzoate, 80 parts of diphenyl isophthalate and 30 parts of hydroquinone were used. The resulting polymer was then polymerized in the solid phase at 250° to 310° C. and 0.2 mmHg for 15 hours to afford a polyester with a high degree of polymerization having a flow initiation temperature of 315° C. and a melt viscosity, at 360° C. and a shear rate of 100 sec$^{-1}$, of 65000 poises and a flow index of 0.96. The resulting polyester was formed into a film in the same way as in Example 1. The film extruded from the T-die had a glass transition temperature of about 190° C. The degree of polymerization, mechanical properties and dimensional stability of the resulting film are shown in Table 1.

Comparative Example 1

Example 3 was repeated except that the film extended at a draft ratio of 4 in the machine direction in Example 3 was heat-treated under tension under the same conditions as in Example 3. The results are shown in Table 1.

TABLE 1

| Run No. | Degree of orientation (%) | | Strength (kg/mm²) | | Young's modulus (kg/mm²) | | Elongation (%) | | Shrinkage (%) (***) |
|---|---|---|---|---|---|---|---|---|---|
| | End view | Side view | MD(*) | TD(**) | MD(*) | TD(**) | MD(*) | TD(**) | |
| Example 1 | 76.4 | 84.3 | 17 | 35 | 480 | 580 | 12 | 12 | below 1 |
| Example 2 | 78.5 | 80.6 | 22 | 33 | 290 | 420 | 18 | 13 | below 1 |
| Example 3 | 77.5 | 82.5 | 24 | 24 | 340 | 450 | 21 | 11 | below 1 |
| Example 4 | 74.5 | 84.5 | 20 | 18 | 350 | 300 | 24 | 16 | below 1 |
| Example 5 | 75.0 | 83.0 | 32 | 23 | 370 | 350 | 48 | 20 | below 1 |
| Comparative Example 1 | Not oriented | 87.0 | 28 | 7 | 440 | 60 | 10 | 110 | below 1 |

(*): Machine direction,
(**): Direction pendicular to the machine direction,
(***): Shrinkage when the sample was maintained at 260° C. for 5 minutes in the air under no tension.

Comparative Example 2

A wholly aromatic polyester having a melt viscosity, at 360° C. and a shear rate of 100 sec$^{-1}$, of 5500 poises was produced in the same way as in Example 1 except that the time of the solid-phase polymerization was changed to 2 hours, and the temperature of the solid-phase polymerization was changed to 230° C.

An attempt was made to form this polymer into a film through a T-die under the same film-forming conditions as in Example 1. However, when the extruded film was extended in a direction perpendicular to the machine direction, the film was split in the machine direction, and no satisfactory film could be obtained.

Separately, an attempt was made to form this polymer into a film through an annular slit under the same film-forming conditions as in Example 2. However, the film was split before it was extended in a direction at right angles to the machine direction by introducing air under pressure. Thus, it could not be extended in the aforesaid perpendicular direction, and no satisfactory film could be obtained.

EXAMPLE 6

The polyester (melt viscosity 75000 poises) obtained by the polymerization method of Example 1 was extruded through an annular slit with a width of 1.5 mm and a diameter of 2 cm at a cylinder temperature of 260° C. and a rate of 0.3 m per minute. The extruded film was taken up while it was passed between nip rollers located 15 cm below a die equipped with the above annular slit. Then, the film was cut open by a fixed knife located further beneath the nip rollers. The monoaxially oriented film was then wound up while it was extended to 2 times in the transverse direction at 250° C. by a mechanical means.

The film finally obtained had a degree of orientation of 75.3% (end view) and 83.5% (side view, a strength of 22 kg/mm² (MD) and 25 kg/mm² (TD), and a Young's mudulius of 350 kg/mm² (MD) and 400 kg/mm² (TD).

EXAMPLE 7

135 parts of phenyl p-hydroxybenzoate, 86 parts of diphenyl terephthalate and 31 parts of resorcinol and 0.07 parts of antimony trioxide were used.

A polyester having a melt viscosity of 40000 poises was prepared in the same way as in Example 1 except that the solid-phase polymerization was carried out for 15 hours.

The resulting polyester was formed into a film in the same way as in Example 1 to form a film having a strength of 17 kg/mm² (MD) and 14 kg/mm² (TD) and a Young's modulus of 320 kg/mm² (MD) and 250 kg/mm² (TD).

EXAMPLES 8 TO 19

Each of the polymers shown in Table 2 was extruded at each of the temperatures indicated in Table 2, and formed into a film.

The properties of the films obtained are shown in Table 2.

TABLE 2

| Example | Recurring units of the polymer (mole % in the parentheses) | | | Melt viscosity (poises) | Extruding temperature (°C.) | Mechanical properties (kg/mm²) | | | |
|---|---|---|---|---|---|---|---|---|---|
| | p-Hydroxybenzoic acid | Aromatic dicarboxylic acid | Aromatic dihydroxy compound | | | Strength | | Young's modulus | |
| | | | | | | MD | TD | MD | TD |
| 8 | p-hydroxybenzoic acid (54) | isophthalic acid (23) | 5-methylhydroquinone (23) | 40000 | 370 | 20 | 19 | 320 | 350 |
| 9 | p-hydroxybenzoic acid (48) | isophthalic acid (26) | Hydroquinone (13) 4,4'-dihydroxydiphenyl (13) | 40000 | 370 | 20 | 18 | 340 | 300 |
| 10 | p-hydroxybenzoic acid (34) | isophthalic acid (33) | 5-chlorohydroquinone (33) | 35000 | 350 | 20 | 17 | 350 | 300 |
| 11 | p-hydroxybenzoic acid (42) | 4-methylisophthalic acid (29) | Hydroquinone (29) | 60000 | 360 | 25 | 23 | 350 | 380 |
| 12 | p-hydroxybenzoic acid (34) | 4-chloroisophthalic acid (33) | Hydroquinone (33) | 30000 | 360 | 24 | 23 | 320 | 400 |
| 13 | p-hydroxybenzoic acid (34) | isophthalic acid (33) | 5-methoxyhydroquinone (33) | 35000 | 350 | 23 | 22 | 330 | 320 |
| 14 | p-hydroxybenzoic acid (48) | 5-methoxyisophthalic acid (26) | Hydroquinone (26) | 40000 | 370 | 25 | 24 | 350 | 340 |
| 15 | p-hydroxybenzoic acid (48) | Isophthalic acid | Hydroquinone (13) 3,3'-dihydroxydiphenyl (13) | 30000 | 360 | 20 | 18 | 320 | 310 |
| 16 | p-hydroxybenzoic acid (54) | Isophthalic acid (23) | Hydroquinone (11) 3,4'-dihydroxydiphenyl (12) | 32000 | 370 | 22 | 20 | 320 | 330 |
| 17 | p-hydroxybenzoic acid (54) | terephthalic acid (23) | 4-chlororesorcinol (23) | 43000 | 350 | 17 | 14 | 310 | 260 |
| 18 | p-hydroxybenzoic acid (54) | Methylterephthalic acid (23) | Resorcinol (23) | 25000 | 350 | 17 | 13 | 340 | 240 |
| 19 | p-hydroxybenzoic acid (54) | Naphthalene-2,6-dicarboxylic acid (23) | Resorcinol (23) | 25000 | 360 | 16 | 14 | 320 | 250 |

What we claim is:

1. A melt-molded film of a wholly aromatic polyester, said film having in its plane two perpendicularly crossing directions in each of which the Young's modulus and strength of the film at 25° C. are at least about 200 kg/mm² and at least about 5 kg/mm² respectively, the product of the Young's moduli of the film in the two directions being at least $8 \times 10^4$ (kg/mm²)², and said wholly aromatic polyester being substantially linear, having a melt viscosity at about its melting point of at least about 10000 poises, and being composed substantially of recurring units derived from p-hydroxybenzoic acid, recurring units derived from a m- or p-oriented aromatic dicarboxylic acid and recurring units derived from a m- or p-oriented aromatic dihydroxy compound, the proportion of said recurring units derived from p-hydroxybenzoic acid being about 30 to about 70 mole% based on the entire recurring units, the melt viscosity ($\eta_a$) of the film being defined by the following equation $$\eta_a = \pi p r^4 / 8lQ \qquad (1)$$

wherein $\eta_a$ is the melt viscosity of a wholly aromatic polyester sample determined by packing about 1 g of a powder of the wholly aromatic polyester sample in a cylinder having a cross-sectional area of 1 cm² and equipped with a nozzle having a diameter of 1 mm and a length of 5 mm centrally at its bottom portion, extruding the polyester under pressure from the nozzle at about its melting point, and measuring the melt viscosity of the polyester when the shear rate (sec⁻¹) defined by the following equation (2)

$$\gamma_a = 4Q/\pi r^3 \qquad (2)$$

reaches 100 sec$^{-1}$; p is the pressure (dyne/cm$^2$) applied; r is the radius ($\equiv$0.05 cm) of the nozzle; l is the length ($\equiv$0.5 cm) of the nozzle; and Q is the rate (cc/sec) of the polyester extruded.

2. The film of claim 1 wherein said recurring units derived from an aromatic dicarboxylic acid are those derived from a m-oriented aromatic dicarboxylic acid, and said recurring units derived from an aromatic dihydroxy compound are those derived from a p-oriented aromatic dihydroxy compound.

3. The film of claim 1 wherein said recurring units derived from an aromatic dicarboxylic acid are those derived from a p-oriented aromatic dicarboxylic acid, and said recurring units derived from an aromatic dihydroxy compound are those derived from a m-oriented aromatic dihydroxy compound.

4. The film of any one of claims 1 to 3 wherein said wholly aromatic polyester is composed substantially of (A) recurring units derived from p-hydroxybenzoic acid, (B) recurring units derived from a m- or p-benzenedicarboxylic acid, and (C) recurring units derived from at least one m- or p-oriented aromatic dihydroxy compound selected from m- or p-dihydroxybenzene and 4,4'-,4,3'- or 3,3'-dihydroxydiphenyl, in which the proportion of the recurring units (A) is about 30 to about 70 mole% based on the entire recurring units, and the mole ratio of the recurring units (B) to the recurring units (C) is 1:0.95–1.05.

5. The film of claim 1 or 2 wherein said wholly aromatic polyester is composed substantially of recurring units derived from p-hydroxybenzoic acid, recurring units derived from isophthalic acid and recurring units derived from hydroquinone.

6. The film of claim 1 or 3 wherein said wholly aromatic polyester is composed substantially of recurring units derived from p-hydroxybenzoic acid, recurring units derived from terephthalic acid and recurring units derived .

7. The film of any one of claims 1 to 6 which has a degree of orientation of about 70 to about 90% in each of two perpendicularly crossing directions parallel to the plane of the film, the degree of orientation being determined by causing an X-ray to fall upon the film in said two directions respectively.

8. The film of any one of claims 1 to 7 which has a heat shrinkage of less than about 1% when heat-treated at 260° C. for 5 minutes in the air under no tension.

9. The film of any one of claims 1 to 8 wherein two perpendicularly crossing directions in each of which the film has a strength of at least 1 kg/mm$^2$ at 250° C. are present within the plane of the film.

10. A process for producing the wholly aromatic polyester film of claim 1, which comprises heating a substantially linear wholly aromatic polyester having a melt viscosity at about its melting point, defined by equation (1) of at least about 10000 and composed substantially of recurring units derived from p-hydroxybenzoic acid, recurring units derived from a m- or p-oriented aromatic carboxylic acid and recurring units derived from a m- or p-oriented aromatic dihydroxy compound, the proportion of said units derived from p-hydroxybenzoic acid being about 30 to about 70 mole% based on the entire recurring units, to a temperature above a point at which the polyester is extrusion-moldable and extruding the heated polyester through a slit; and either (i) orienting the extruded film in the extruding direction or machine direction and a direction perpendicular thereto while the heated aromatic polyester resides in said slit or after it has left the slit but before it is cooled to the glass transition temperature of the polyester, or (ii) orienting the extruded film substantially only in the extruding direction or machine direction while the polyester heated at said temperature resides in the slit, or after it has left the slit but before it is cooled to the glass transition temperature of the polyester, and then re-heating the film to a temperature higher than the glass transition temperature of the polyester, and orienting the film in a direction perpendicular to the machine direction.

11. The process of claim 10 wherein said wholly aromatic polyester is heated to a temperature above a point at which it is extrusion-moldable, and then extruded through the slit to form a film oriented substantially only in the machine direction, and then the resulting film is re-heated to a temperature higher than the glass transition temperature of the film and stretched in a direction perpendicular to the machine direction, thereby to orient the film both in the machine direction and the direction perpendicular thereto.

12. The process of claim 11 wherein said wholly aromatic polyester is heated to a temperature above a point at which it is extrusion-moldable, extruded through the slit, and taken up at a draft ratio of about 2 to about 10 to obtain a film oriented substantially only in the machine direction, and thereafter the film is re-heated to a temperature between a temperature about 10° C. higher than the glass transition point of the film and a temperature about 90° C. higher than the glass transition point and stretched to about 1.5 to about 5 times in a direction perpendicular to the machine direction.

13. The process of claim 10 wherein said wholly aromatic polyester is heated to a temperature above a point at which is extrusion-moldable, extruded through an annular slit, and taken up while the resulting annular film is being expanded by maintaining the pressure of the inside of the film higher than that of the outside of the film before the extruded annular film is cooled to the glass transition point of the film, thereby to orient the film both in the machine direction and the direction perpendicular thereto.

14. The process of claim 13 wherein said wholly aromatic polyester is heated to a temperature above a point at which it is extrusion-moldable, extruded through an annular slit, and then taken up at a draft of about 1 to about 4 while the extruded annular film is being expanded at a blow ratio of about 2 to about 10 by introducing a gas into the inside of the film to machine the pressure of the inside of the film higher than that in the outside of the film before the extruded film is cooled to the glass transition point of the film.

15. The process of claim 14 wherein the blow ratio is at least two times the draft ratio.

16. The process of claim 13 wherein said wholly aromatic polyester is heated to a temperature above a point at which it is extrusion-moldable, extruded through an annular slit, then substantially oriented in the machine direction at a draft of about 2 to about 10 before the extruded annular film is cooled to the glass transition point of the film, then the film oriented substantially in the machine direction is oriented in a direction perpendicular thereto the machine direction while it is being expanded at a blow ratio of about 1.5 to about 5 by introducing a gas into the inside of the film to maintain the pressure of the inside of the film higher than that in the outside of the film before the film substantially oriented in the machine direction is cooled to the glass transition point of the film, the film being taken up while achieving the two orientations.

17. The process of claim 10 wherein said wholly aromatic polyester is heated to a temperature above a point at which it is extrusion-moldable, extruded through a slit, and oriented substantially in the machine direction at a draft ratio of about 2 to about 10 before the extruded film is cooled to the glass transition temperature of the film, and thereafter the film oriented substantially in the machine direction is extended to about 1.5 to about 5 times by a mechanical means in a direction perpendicular to the machine direction before the film substantially oriented in the machine direction is cooled to the glass transition temperature of the film, the film being taken up while achieving the two orientations.

18. The process of any one of claims 10 to 17 wherein the extrusion of the wholly aromatic polyester is carried out at a temperature between a temperature about 10° C. lower than the melting point of the polyester and a temperature about 50° C. higher than the melting point.

19. The process of claim 10 which further comprises heat-treating the film oriented in the machine direction and in the direction perpendicular thereto at a temperature between a temperature about 100° C. lower than the melting point of the polyester and a temperature about 30° C. lower than the melting point under tension.

* * * * *

UNITED STATES PATENT AND TRADEMARK OFFICE
CERTIFICATE OF CORRECTION

PATENT NO. : 4,333,907
DATED : June 8, 1982
INVENTOR(S) : Urasaki, et al.

It is certified that error appears in the above—identified patent and that said Letters Patent is hereby corrected as shown below:

First page, item [73] should read as follows:

Assignee: Teijin Limited, Osaka, Japan

Claim 6, line 5, after "derived" insert -- from resorcinol.--.

Signed and Sealed this

Third Day of August 1982

[SEAL]

Attest:

GERALD J. MOSSINGHOFF

Attesting Officer

Commissioner of Patents and Trademarks